United States Patent [19]

Collins

[11] 3,867,641

[45] Feb. 18, 1975

[54] AC LOAD ACTUATION CIRCUIT

[75] Inventor: John E. Collins, North Hudson, Wis.

[73] Assignee: Minnesota Mining and Manufacturing Company, St. Paul, Minn.

[22] Filed: Feb. 13, 1974

[21] Appl. No.: 442,192

[52] U.S. Cl. ............ 307/117, 307/252 UA, 323/18, 323/21

[51] Int. Cl. .......................................... H03k 17/16

[58] Field of Search.... 307/117, 133, 252 R, 252 A, 307/252 N, 252 P, 252 UA, 311; 323/18, 19, 21, 22 SC

[56] References Cited

UNITED STATES PATENTS

| | | | |
|---|---|---|---|
| 3,417,320 | 12/1968 | Muskovac | 323/22 SC |
| 3,510,750 | 5/1970 | Horino et al. | 323/21 X |
| 3,577,177 | 5/1971 | Hewlett | 323/18 |

*Primary Examiner*—A. D. Pellinen
*Attorney, Agent, or Firm*—Alexander, Sell, Steldt & Delahunt

[57] ABSTRACT

A photon coupler including a phototransistor and an LED are connected to a thyristor load switching element for triggering the thyristor to switch a load into connection with an AC source in response to actuation of the LED by a low level DC control signal from a logic circuit. A capacitor is connected in the circuit to provide a triggering current through the phototransistor which leads the load voltage in phase to thereby provide a maximum level triggering current near the zero voltage crossing point for the load, thus providing maximum available power to the load while minimizing RF interference and power dissipation. A zener diode is connected to the phototransistor and to the capacitor for limiting the level of the voltage across the phototransistor due to current flow from the capacitor when power is first applied to the load actuation circuit thereby to protect the phototransistor and also thereby to enable triggering of the SCR only in response to the gating of the phototransistor due to the actuation of the LED.

10 Claims, 1 Drawing Figure

PATENTED FEB 18 1975 3,867,641
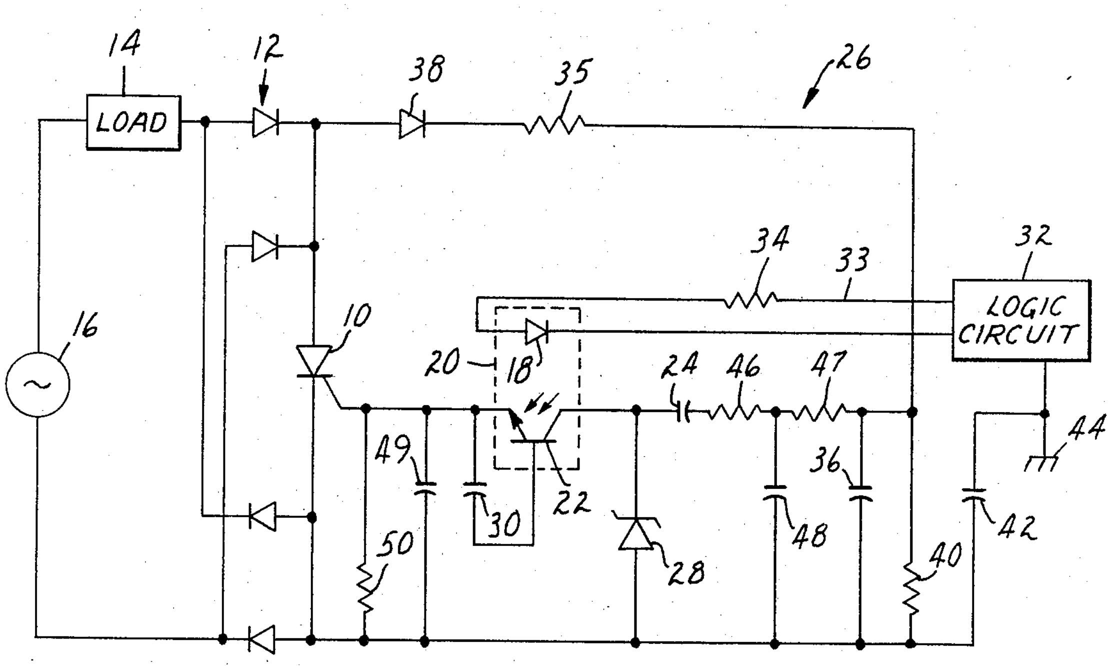

AC LOAD ACTUATION CIRCUIT

BACKGROUND OF THE INVENTION

The present invention is related to AC load actuation circuits, and is particularly directed to such circuits wherein a load is switched into connection with an AC source by operation of a thyristor load switching element responding to a triggering current provided in response to an actuation of a photon coupler.

Typically a resistive voltage dividing network is included in the load actuation circuit for generating a triggering current to the thyristor switching element, such as an SCR. The triggering current is provided through a low voltage photosensitive triggering element, such as a phototransistor in the photon coupler. The resistive voltage dividing network is connected between the anode and the cathode of the SCR. This network divides the high peak voltage appearing across the SCR down to a level below the breakdown rating of the triggering element in the photon coupler, whereby when the photon coupler is actuated to thereby lower the breakdown point in the triggering element the SCR switching element is triggered to connect the load to the source at that phase of the voltage across the SCR where the triggering element breaks down to deliver a sufficient triggering current to the SCR. However, there is a drawback inherent in this approach. When a minimum amount of phase control is employed in order to provide maximum load power and minimum radio frequency (RF) interference, a large amount of power is necessarily dissipated in the resistors of the voltage dividing network. On the other hand, if a greater amount of phase control is employed in order to reduce such power dissipation, less of the available input voltage is necessarily provided across the load and a greater amount of RF interference is generated.

SUMMARY OF THE INVENTION

The present invention comprises an improvement to the type of AC load actuation circuit wherein a thyristor load switching element is triggered by a photon coupler for switching a load into connection with an AC source. Maximum available power is delivered to the load and both RF interference and power dissipation are minimized by connecting a capacitor in the load actuation circuit for providing a triggering current through the photosensitive element to the thyristor gate which leads the load voltage in phase to thereby provide a maximum level triggering current near the zero voltage crossing point for the load.

The photon coupler comprises a light emitting element and a photosensitive triggering element which is connected to the gate of the thyristor load switching element for triggering the thyristor in response to the light emitting element being actuated by a control signal.

A zener diode is connected to the photosensitive element and to the capacitor for limiting the level of the voltage across the photosensitive triggering element due to current flow from the capacitor when power is first applied to the load actuation circuit thereby to protect the photosensitive triggering element and also thereby to enable triggering of the thyristor only in response to the gating of the photosensitive triggering element due to the actuation of the light emitting element.

In the preferred embodiment the thyristor load switching element comprises an SCR. Equivalent thyristor switching elements which may be used in the circuit of the present invention include a triac and a compound npn-pnp transistor.

The photon coupler used in the preferred embodiment includes a light emitting diode (LED) and a phototransistor. The LED is preferred because it has a faster response and lower power dissipation than other light emitting elements, such as lamps. In lieu of a phototransistor a photo-SCR or a photodiode may be used as the photosensitive triggering element.

Other features of the present invention are discussed hereinafter with reference to the description of the preferred embodiment.

BRIEF DESCRIPTION OF THE DRAWING

The FIGURE of the drawing is a schematic circuit diagram of a preferred embodiment of an AC load actuation circuit in accordance with the present invention.

DESCRIPTION OF THE PREFERRED EMBODIMENT

An SCR 10 is included in a rectifier bridge 12 for connecting a load 14 to an AC electrical power source 16 when triggered in response to actuation of an LED 18 in a photon coupler 20. When the LED 18 is actuated, a phototransistor 22 included in the photon coupler 20 is enabled to conduct a triggering current to the gate of the SCR 10.

The triggering current is provided from a capacitor 24 which is connected in the load actuation circuit 26 for providing a triggering current which leads the voltage across the load 14 in phase thereby to provide a maximum level triggering current near the zero voltage crossing point from the load 14.

A zener diode 28 is connected to the collector of the phototransistor 22 and to the capacitor 24 for limiting the level of the voltage across the phototransistor 22 due to current flow from the capacitor 24 when power is first applied to the load actuation circuit 26, thereby to protect the phototransistor 22 and also thereby to enable triggering of the SCR 10 only in response to the gating of the phototransistor 22 due to actuation of the LED 18.

A capacitor 30 is connected between the emitter and the base of the phototransistor 22 for inhibiting triggering of the SCR 10 when power is first applied to the load actuation circuit 26 by preventing amplification of displacement current flowing from the collector to the base of the phototransistor 22.

The LED 18 is connected to a logic circuit 32 from which a low level DC signal, such as 5 volts, is supplied on a line 33 for actuating the LED 18. Accordingly the load 14 may be readily switched into connection with the AC source 16 in response to the provision of a low level DC signal from a logic circuit 32 which is electrically isolated from both the load 14 and the source 16.

The various other elements of the load actuation circuit 26 perform the following functions. A resistor 35 and a capacitor 36 constitute a snubber network which serves to limit the maximum rate of rise of the voltage across the SCR 10, thereby preventing undesired turn-on during initial application of power and during commutation of an inductive load. A diode 38 is provided to prevent the SCR 10 from latching in the presence of inductive loads. A resistor 40 is provided to allow the capacitor 24 to partially discharge during the latter portion of each half cycle of the AC voltage across the load 14 so that triggering current will again be available at the beginning of the succeeding half cycle. A capacitor 42 is connected to the logic circuit ground 44 for preventing the SCR 10 from being triggered by displacement current from the LED 18 to the phototransistor 22 when power is first applied to the load actuation circuit 26. A low pass filter network consisting of resistors 46 and 47 and a capacitor 48 serves to isolate fast rising noise pulses from the capacitor 24 and the phototransistor 22.

In a preferred embodiment of the AC load actuation circuit, which is designed for connecting a 3 ampere resistive or inductive load to a 110 volt AC source, the following identified components are used in the circuit shown in the figure of the drawing:

| | |
|---|---|
| SCR 10: | C 106B |
| Rectifier bridge 12 diodes: | IN 5624 |
| Photon coupler 20: | 4N37 |
| Capacitor 24: | 0.047 microfarads |
| Zener diode 28: | IN 748A |
| Capacitor 30: | 1,000 picofarads |
| Resistor 34: | 270 ohms |
| Resistor 35: | 100 ohms |
| Capacitor 36: | 0.1 microfarad |
| Diode 38: | IN 4003 |
| Resistor 40: | 62,000 ohms |
| Capacitor 42: | 1,000 picofarads |
| Resistor 46: | 1,000 ohms |
| Resistor 47: | 1,000 ohms |
| Capacitor 48: | 1,000 picofarads |
| Capacitor 49: | 1,000 picofarads |
| Resistor 50: | 1,200 ohms |

What is claimed is:

1. An AC load actuation circuit comprising a thyristor load switching element for switching a load into connection with an AC source and a photon coupler for triggering the thyristor load switching element, wherein the improvement comprises in combination;

said photon coupler comprising a light emitting element and a photosensitive triggering element which is connected to the gate of said thyristor load switching element for triggering the thyristor in response to the light emitting element being actuated by a control signal;

a capacitor connected in the load actuation circuit for providing a triggering current through the photosensitive element to the thyristor gate which leads the load voltage in phase to thereby provide a maximum level triggering current near the zero voltage crossing point for the load; and a zener diode connected to the photosensitive element and to the capacitor for limiting the level of the voltage across the photosensitive triggering element due to current flow from the capacitor when power is first applied to the load actuation circuit thereby to protect the photosensitive triggering element and also thereby to enable triggering of the thyristor only in response to the gating of the photosensitive triggering element due to the actuation of the light emitting element.

2. An AC load actuation circuit according to claim 1, wherein the thyristor load switching element comprises an SCR.

3. An AC load actuation circuit according to claim 1, wherein the light emitting element comprises an LED.

4. An AC load actuation circuit according to claim 1, wherein the photosensitive triggering element comprises a phototransistor.

5. An AC load actuation circuit according to claim 4, wherein the light emitting element comprises an LED.

6. An AC load actuation circuit according to claim 4, further comprising a second capacitor connected between the emitter and the base of the phototransistor for inhibiting triggering of the thyristor when power is first applied to the load actuation circuit by preventing amplification of displacement current flowing from the collector to the base of the phototransistor.

7. An AC load actuation circuit according to claim 1, further comprising a logic circuit connected to the light emitting means for providing a DC signal as the control signal for actuating the light emitting means.

8. An AC load actuation circuit comprising an SCR load switching element for switching a load into connection with an AC source and a photon coupler for triggering the SCR load switching element, wherein the improvement comprises in combination;

said photon coupler comprising an LED and a phototransistor which is connected to the gate of said SCR load switching element for triggering the SCR in response to the LED being actuated by a control signal;

a capacitor connected in the load actuation circuit for providing a triggering current through the phototransistor to the SCR gate which leads the load voltage in phase to thereby provide a maximum level triggering current near the zero voltage crossing point for the load; and a zener diode connected to the phototransistor and to the capacitor for limiting the level of the voltage across the phototransistor due to current flow from the capacitor when power is first applied to the load actuation circuit to thereby protect the phototransistor and to thereby enable triggering of the SCR only in response to the gating of the phototransistor due to the actuation of the LED.

9. An AC load actuation circuit to claim 8, further comprising a second capacitor connected between the emitter and the base of the phototransistor for inhibiting triggering of the SCR when power is first applied to the load actuation circuit by preventing amplification of displacement current flowing from the collector to the base of the phototransistor.

10. An AC load actuation circuit according to claim 8, further comprising a logic circuit connected to the LED for providing a DC signal as the control signal for actuating the LED.

* * * * *